(12) United States Patent
Daas et al.

(10) Patent No.: US 10,423,675 B2
(45) Date of Patent: Sep. 24, 2019

(54) SYSTEM AND METHOD FOR AUTOMATED DOMAIN-EXTENSIBLE WEB SCRAPING

(71) Applicant: Intuit Inc., Mountain View, CA (US)

(72) Inventors: Soumendra Daas, Bangalore (IN); Nanjangud C. Narendra, Bangalore (IN); Sekar Udayamurthy, Bangalore (IN)

(73) Assignee: Intuit Inc., Mountain View, CA (US)

( * ) Notice: Subject to any disclaimer, the term of this patent is extended or adjusted under 35 U.S.C. 154(b) by 744 days.

(21) Appl. No.: 15/085,948

(22) Filed: Mar. 30, 2016

(65) Prior Publication Data

US 2017/0220681 A1 Aug. 3, 2017

(30) Foreign Application Priority Data

Jan. 29, 2016 (IN) .............................. 201631003317

(51) Int. Cl.
*G06F 16/00* (2019.01)
*G06F 16/951* (2019.01)
*H04L 29/08* (2006.01)
*G06F 17/24* (2006.01)

(52) U.S. Cl.
CPC .......... *G06F 16/951* (2019.01); *G06F 17/248* (2013.01); *H04L 67/02* (2013.01)

(58) Field of Classification Search
CPC ............. G06F 17/30864; G06F 17/248; G06F 17/30386; G06F 17/30964; G06F 16/951; G06F 16/24; G06F 16/43; G06F 16/903; H04L 67/02
See application file for complete search history.

(56) References Cited

U.S. PATENT DOCUMENTS

| | | | |
|---|---|---|---|
| 7,072,890 B2 | 7/2006 | Salerno et al. | |
| 7,647,351 B2 | 1/2010 | Monsarrat | |
| 9,405,833 B2* | 8/2016 | Tuttle | G06F 16/958 |
| 2005/0022115 A1* | 1/2005 | Baumgartner | G06F 16/9535 |
| | | | 715/205 |
| 2008/0114739 A1* | 5/2008 | Hayes | G06F 16/951 |
| 2008/0114800 A1* | 5/2008 | Gazen | G06F 16/95 |
| 2010/0114814 A1 | 6/2010 | Monsarrat | |

(Continued)

OTHER PUBLICATIONS

Mehlfuhrer, A., "Web Scraping A Tool Evaluation," Fakultät für Informatik der Technischen Universität Wien, thesis published Feb. 23, 2009.

(Continued)

*Primary Examiner* — Noosha Arjomandi
(74) *Attorney, Agent, or Firm* — Hawley Troxell Ennis & Hawley LLP; Philip McKay

(57) ABSTRACT

An automated extensible scraping script is generated for web scraping that is extensible to a plurality of domains. Web sites are classified based on common extracted domain data, further clustering the data based on common navigation structures, and using such commonalities to automate the generation of scraping code based on predefined and reusable code snippets for specific parts of the web sites. Scraping services include a mapper module and a script generator module. Building blocks include a data model updater, a navigation model generator and a navigation model matcher. An administrative module includes domain clustering and configuration file maintenance.

14 Claims, 4 Drawing Sheets

(56) References Cited

U.S. PATENT DOCUMENTS

| | | | |
|---|---|---|---|
| 2012/0310914 A1* | 12/2012 | Khan | G06F 16/951 |
| | | | 707/710 |
| 2012/0317472 A1 | 12/2012 | Chernysh | |
| 2013/0191723 A1* | 7/2013 | Pappas | G06F 17/2247 |
| | | | 715/234 |
| 2013/0311875 A1* | 11/2013 | Pappas | G06F 17/2247 |
| | | | 715/234 |
| 2016/0246481 A1* | 8/2016 | Dakua | G06F 16/972 |
| 2017/0098100 A1* | 4/2017 | Yadgiri | G06F 21/6254 |
| 2017/0124481 A1* | 5/2017 | Crabtree | G06Q 10/0637 |

OTHER PUBLICATIONS

England, M., "Web Scraping of Product Information From the Client's Perspective," Fakultät Informatik, Institut Systemarchitektur, Lehrstuhl Rechnernetze, master thesis published Jan. 31, 2010.

Fernandez-Villamore, J., et al., "A Semantic Scraping Model for Web Resources," Conference: ICAART 2011—Proceedings of the 3rd International Conference on Agents and Artificial Intelligence, vol. 2—Agents, Rome, Italy, Jan. 28-30, 2011.

Thomsen, J., et al.; "WebSelF: a Web Scraping Framework;" Conference: Proceedings of the 12th International Conference on Web Engineering, Jul. 2012.

Swami, S., et al., "Web Scraping Framework Based on Combining Tag and Value Similarity," pp. 118-122, IJCSI International Journal of Computer Science Issues, vol. 10, Issue 6, No. 2, Nov. 2013.

Penman, R., et al., "Web Scraping Made Simple with SiteScraper," [online], [retrieved Nov. 30, 2015]. Retrieved from the internet <URL: http://sitescraper.googlecode.com/files/sitescraper.pdf>.

"Data Extraction," [online], [retrieved Aug. 9, 2016]. Retrieved from the internet <URL: http://imacros.net/overview/data-extraction>.

\* cited by examiner

SYSTEM AND METHOD FOR AUTOMATED DOMAIN-EXTENSIBLE WEB SCRAPING

BACKGROUND

The Word Wide Web enables a web resource, such as a document, to be identified by a web address, such as a Uniform Resource Locator (URL) that provides a global naming scheme for web resources. A web address specifies a web resource's location on the World Wide Web and explains the means by which a web resource can be accessed via the Internet. For example, a URL for a web page may utilize Hypertext Transfer Protocol (HTTP), and when the URL is entered into an address bar of a web browser, then the web browser displays the web page. The web page may include information including a hypertext link, such as Hypertext Markup Language (HTML), that provides for the web page to link to other web pages. It is these hyperlinks of web pages that create what can be called a web of information, which is another description of the World Wide Web.

Although it is not possible to know how many web sites there are on the World Wide Web, an estimate is that the count is above one billion. Such reflects an immense amount of information for a user to manually browse with a web browser, such as Microsoft Internet Explorer, Google Chrome, and the like. In order to assist users in finding and processing information available on the World Wide Web, a process known as web crawling has been developed to automate the browsing, grabbing and sifting of information on the World Wide Web. Such can attempt to simulate a user's exploration of the World Wide Web to automatically extract useful information. Web crawling is accomplished with a web robot that is a software application of process instructions that execute automated and repetitive tasks via the Internet. One of those repetitive tasks is to extract structured and unstructured information from a web page, and convert that information into a form that can be stored in a central database. Such data extraction from a web page is commonly called web scraping, and may be beneficial for online price comparisons, centralized job postings on career web sites, and analyzing market research, among other uses. Web scraping allows for the collection of information from a web site without having to directly access any back-end databases, for example, through applicable application programming interfaces (APIs). Traditional financial management systems provide a mechanism to upload information from a service provider's system to the financial management system, such as through a data transfer interface that may utilize APIs. For example, a banking system may transfer a user's bank transactional records to a financial management system via APIs associated with the Open Financial Exchange (OFX) Standard or the like.

Web sites are generally intended to be displayed to an end-user and are not generally intended to be utilized for data transfers between software systems. Nevertheless, scraping is a data transfer process that can be at a semantic level or a syntactic level. Semantic level scraping utilizes a common framework for structured data. A web page may utilize a markup language such as Extensible Markup Language (XML) that promotes structured data with rules for encoding data that is both human-readable and machine-readable. A script may be created from a scripting language such as PERL, Tcl, Python, and the like, and a script may extract well-formed XML content comprising data at the semantic level. Under some embodiments, a script comprises processing instructions. Such may be advantageous because a web page's HTML may change due to changes in the look and feel of the web page, yet the script can still extract the XML content at a semantic level. For example, the data may be presented in a systematic way through XML elements that convey the meaning of the data.

On the other hand, syntactic level scraping refers to scraping data that is not presented in a systematic way. Web scraping at the syntactic level is often considered a manually intensive process to create scripts to extract information. For example, one may rely on knowledge of specific markup practices or document structures to determine data items among other web page elements. Such knowledge can be used to recognize data structures on a web page, and create a script to extract data at the syntactic level. Scraping data that is presented in a syntactic way can be prone to difficulties because when a web page's layout or HTML changes, the script must often be rewritten in response to continue to scrape the web page at the syntactic level. Until the script is rewritten, the data that had been retrieved in the past can often no longer be retrieved.

The creation of a script to scrape a web page at the syntactical level may be further complicated by the lack of domain-specific knowledge for a web page, in which a domain may be an industry grouping such as financial institutions, healthcare institutions, insurance institutions, travel institutions, legal institutions, and others. Having knowledge to create scraping scripts in one domain does not necessarily mean that one can create scraping scripts in other domains. For example, the creation of a script to scrape a financial institution web page at the syntactic level may require knowledge about how financial transactions are presented on a web page. In contrast, the creation of a script to scrape a healthcare institution web page at the syntactic level may require knowledge about how healthcare transactions are presented on a web page. Because of the diversity of domains, a developer who creates scripts and who possesses the knowledge to extract transactions from one domain may not have the knowledge to extract transactions from another domain.

Accordingly, there is a need to improve the creation of scraping scripts that extract information from web pages across different domains.

SUMMARY

In accordance with an embodiment, the present disclosure of automated domain-extensible web scraping addresses some of the shortcomings associated with traditional web scraping. The disclosed automated domain extensible web scraping system and method is configured to allow the automatic generation of scripts to enable scraping services that is domain-extensible.

Information related to a user may be stored by a domain service provider's system, such as a banking system, and may be accessed by a user through the domain service provider's web site, such as a banking web site. When information related to the user is stored by the systems of a plurality of domain service providers, such as two or more banking systems, it may be beneficial to extract such information from the plurality of systems and consolidate the information, for example, for aggregated or consolidated reporting purposes.

A user's information may be displayed on a domain service provider's web site, and it may be beneficial to extract such information directly from a display interface of the web site. Such information extraction from a web site is a technique commonly known as web scraping. However, traditional web scraping techniques have a shortcoming of not being extensible to multiple domains.

In accordance with an embodiment, the present disclosure provides systems and methods for automated extensible web scraping that is extensible to a plurality of domains, for example, financial, retail, news, sports, and the like. The systems and methods include classifying web sites based on common extracted domain data, further clustering the data based on common navigation structures, and using such commonalities to automate the generation of scraping code based on predefined and reusable scripts or code snippets of process instructions for specific pages or elements of the web sites.

In accordance with an embodiment, a system or method may include a scraping services module of a mapper and a script generator. The system or method may further include a building blocks module of a data model updater, a navigation model generator and a navigation model matcher. The information for the building blocks module may be stored in a database. The system may further include an administrative module of script clustering and configuration file maintenance. The information for the administrative module may be stored in the database.

In accordance with an embodiment, a system or method may include a mapper module, a script generator module and a scraping program module. The mapper module enables navigation of web pages of a new web site. Such enables the creation of an instance of a data model and an instance of a navigation model for the new web site. The creation of data model instances may also include identifying appropriate input fields of the new web site via a comparison to a data dictionary that contains domain-specific synonyms or leverages an existing data model for a different domain. The navigation model may be used for modeling the actual user interface flow of the web site, and may be used as a basis for script generation. This model may be stored in a graph database.

In accordance with an embodiment, data of a data dictionary that is stored in a database may include pages, columns, identifier messages, identifier conditions, error messages, error conditions, and the like. Such may be beneficial to describe different domain terms for the same data. For example, a bank may name a transaction date a "transaction data date" in one country, such as the United States, and translate that term to a foreign language in another country, such as France. The data dictionary allows for further capturing knowledge of nuances of known errors and messages of a web site. For further example, there may be differences of page or column identifiers for web sites with different domain names.

In accordance with an embodiment, the data dictionary defines the information to acquire from a web page, such as customer name information or bank account information. Furthermore, a page dump may include page dump information of extracted pages of a web site. The navigation model module may include a navigation model matching algorithm that is selected or created and may utilize data dictionary storage and page dump storage for comparison and matching purposes. The data model may utilize the results of the navigation model matching algorithm, which may populate node properties of a graph database. The mapper module may receive information resulting from the navigation model and/or the data model based on a received web site name.

In accordance with an embodiment, the script generator module takes the outputs from the data model and the navigation model, via the mapper module, and matches the new navigation model with the exact or closest available match of navigation models in its repository of the database. The script generator module uses the closest navigation model as a guide to generating a scraping program or scraping script for the new web site or web page. In some embodiments, such may be a user-assisted process that prompts the user to specify scripts or code snippets for extracting data from specific pages on a web site. Under some embodiments, the script generator may utilize a configuration file, which may be web site specific and may include inputs or instructions for script execution.

In accordance with an embodiment, the scraping program module takes the outputs from the script generator module and utilizes the generated scraping script or program that may perform syntactic level scraping of the web site. A data extraction service module may facilitate the syntactic level scraping. Furthermore, a script template may be created by the data extraction service module that may be utilized by the script generator module to generate other scripts.

In accordance with an embodiment, the operation of the mapper module may have the following sequence. The mapper module may receive from a user, such as a developer, a web site name or a class of a domain, such as a financial class. The mapper module may then query the data model for data, and may receive applicable data. The mapper module may then generate a map for scraping of the web site, for example, starting with the home page of the web site. The mapper module may generate a map for iteratively scraping one or more pages of the web site. In some embodiments, the mapper module may query the user for user input. The mapper module may also receive page information from the web site. The mapper module may receive user input, and the mapper module may then update the data model. The mapper module may also add a navigation model to the graph database.

In accordance with an embodiment, the operation of the script generator module may have the following sequence. The model matcher module may receive from the graph database a navigation model. The script generator module may receive from a navigation model matcher module a closest match of the navigation model. The script generator module may then request data fields for matched web site information from the data dictionary, and the data dictionary may return applicable data fields for the matched web site information. The script generator module may then request applicable application programming interfaces (APIs) from the configuration file, which returns the applicable APIs. The script generator then composes a scraping script. Under some embodiments, the scraping script may be provided to the user such as a developer, for example, for editing or modification by the user.

The disclosed method and system for automated domain-extensible web scraping does not encompass, embody, or preclude other forms of innovation in the area of web scraping or consolidation of user data. In addition, the disclosed method and system for automated domain-extensible web scraping is not related to any fundamental economic practice, fundamental data processing practice, mental steps, or pen and paper based solutions, and is, rather, directed to providing solutions to the relatively new problems associated with scraping data from web sites from different domains. Consequently, the disclosed method and system for automated domain-extensible web scraping is not directed to, does not encompass, and is not merely, an abstract idea or concept.

In addition, the disclosed method and system for automated domain-extensible web scraping provides for significant improvements to the technical fields of web scraping, information dissemination, information consolidation, data processing, data management, and user experience. The automatic generation of a script that is domain-extensible is an improvement over manually creating a script for a new web site created in a new or existing domain. Such automatic generation of a script is a further improvement over manually modifying a scraping script when a web site changes. For example, if a financial institution changes a web site, such as without an announcement or documentation, the disclosed method and system can quickly adapt to the financial institution's changes and thus potentially limit the disruption experienced by a user who would prefer that the data from the financial institution be aggregated or consolidated.

Therefore, the various embodiments of the disclosure, and their associated benefits, as discussed herein, improve the technical field of web scraping. Consequently, the disclosed embodiments amount to significantly more than an implementation of the abstract idea of a user viewing a web site.

Figure 1:
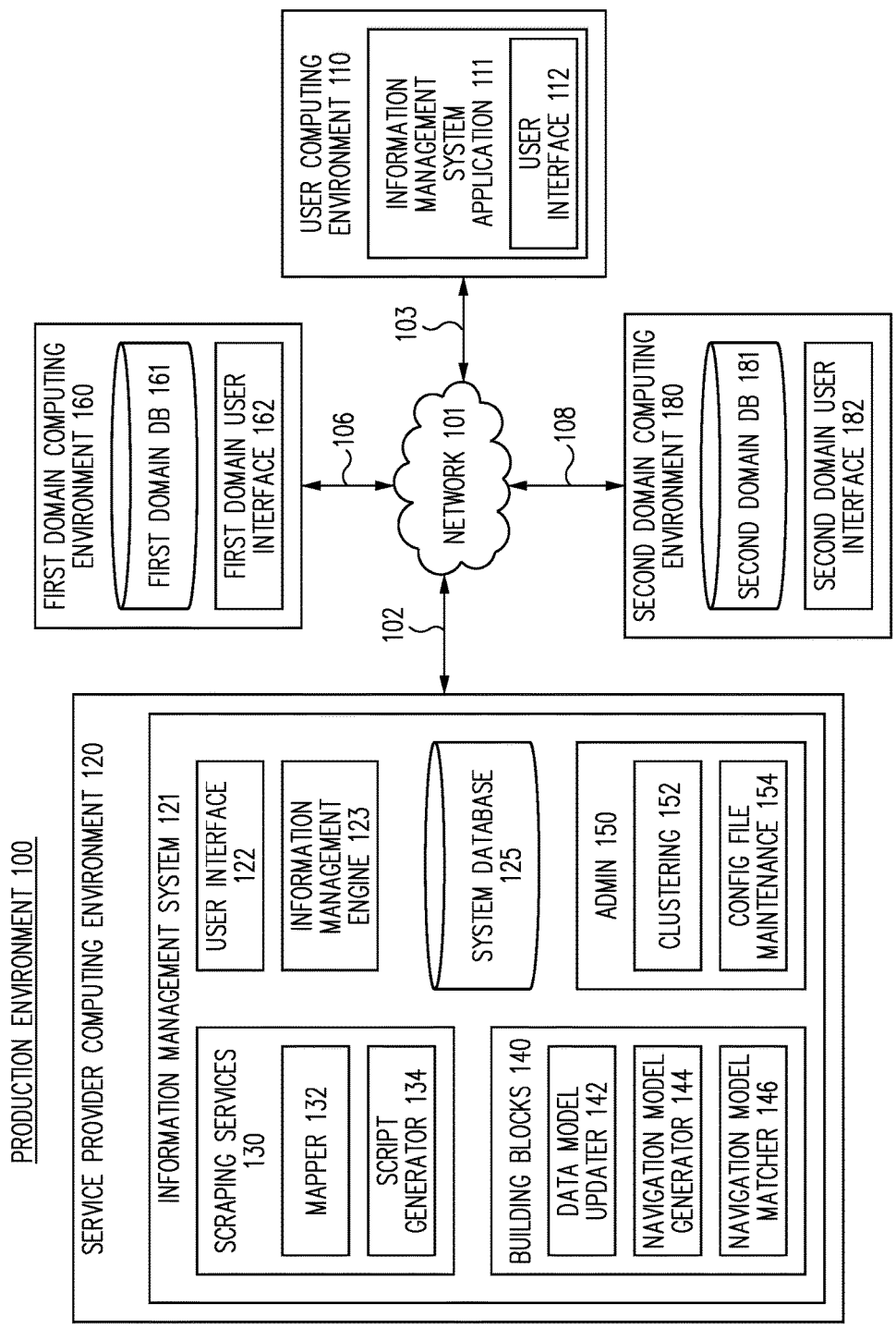
FIG. 1 is block diagram of a production environment for automated domain-extensible web scraping, in accordance with various embodiments.

Common reference numerals may be used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

Term Definitions

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; or any other movable/mobile device and/or computing system that includes components that can execute all, or part, of any one of the processes and/or operations as described herein. The terms "mobile computing system" and "mobile device" may further include devices worn or carried by a user such as, but not limited to, smart watches, wearable Personal Digital Assistants (PDAs); wearable media players; wearable Internet appliances; wearable phones; and/or any other computing system that can be worn by a user and that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network categories; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network categories; or any other system capable of allowing communication between two or more assets, virtual assets, and/or computing systems, whether available or known at the time of filing or as later developed.

Herein, the term "user," "party," "user consumer," and "customer" are used interchangeably to denote any party and/or entity that interfaces with, and/or to whom information is provided by, any of the methods or systems discussed herein. For instance, in various embodiments, a user can be, but is not limited to, a person, a commercial entity, an application, a service, and/or a computing system.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein include systems and processes suitable for automated domain-extensible web scraping, according to various embodiments.

Introductory System

In various embodiments, a scraping script is generated that scrapes web sites of institutions across domains. For example, with respect to a financial institution, a scraping script may be generated that extracts or reads from a bank web site the payee, amount, and date of a transaction by parsing the data out of the bank's web site. Each generated script may be unique to each web site that displays the data of a user. Under some embodiments, the generated script, when executed, acts on a user's behalf to log into a web site and access information displayed on the web page. Such scraping may be done during non-peak hours to avoid increasing a web site's response time due to the scraping. Such scraping may be beneficial to aggregate or consolidate a user's data stored in different domains.

The disclosed method and system for automated domain-extensible web scraping does not encompass, embody, or preclude other forms of innovation in the area of web scraping or consolidation of user data. In addition, the disclosed method and system for automated domain-extensible web scraping is not related to any fundamental economic practice, fundamental data processing practice, mental steps, or pen and paper based solutions, and is, rather, directed to providing solutions to the relatively new problems associated with scraping data from web sites from different domains. Consequently, the disclosed method and system for automated domain-extensible web scraping is not directed to, does not encompass, and is not merely, an abstract idea or concept.

In addition, the disclosed method and system for automated domain-extensible web scraping provides for significant improvements to the technical fields of web scraping, information dissemination, information consolidation, data processing, data management, and user experience. The automatic generation of a script that is domain-extensible is an improvement over manually creating a script for a new web site created in a new or existing domain. Such automatic generation of a script is a further improvement over manually modifying a scraping script when a web site changes. For example, if a financial institution changes a web site, such as without an announcement or documentation, the disclosed method and system can quickly adapt to the financial institution's changes and thus potentially limit the disruption experienced by a user who would prefer that the data from the financial institution be consolidated.

Therefore, the various embodiments of the disclosure, and their associated benefits, as discussed herein, improve the technical field of web scraping. Consequently, the disclosed embodiments amount to significantly more than an implementation of the abstract idea of a user viewing a web site.

Hardware Architecture

FIG. 1 is a block diagram of a production environment 100 for automated domain-extensible web scraping, in accordance with various embodiments. As seen in FIG. 1, in this illustrative example, the production environment 100 includes a user computing environment 110 and a service provider computing environment 120 for managing a user's information, such as financial information, according to one embodiment. The computing environments 110 and 120 are communicatively coupled to each other through a network 101, with a communication channel 102, and with a communication channel 103, according to one embodiment.

The user computing environment 110 includes one or more computing systems that are configured to transmit information to the service provider computing environment 120 and that are configured to receive information from the service provider computing environment 120 to enable a user to receive information management services from the service provider computing environment 120, according to one embodiment. The user computing environment 110 includes an information management system application 111, according to one embodiment. The information management system application 111 includes a subset of information management system features that are available from the service provider computing environment 120, according to one embodiment. For example, the information management system application 111 includes a user interface 112 that enables a user to view, add, remove, and/or otherwise manage data and/or information, such as financial information, stored by and/or within the information management system 121, according to one embodiment. For example, through the user computing environment 110, the user can access, view, and manage financial transaction records associated with the user's financial accounts, such as bank accounts and credit card accounts, according to one embodiment.

The service provider computing environment 120 represents one or more computing systems such as, but not limited to, a server, a computing cabinet, and/or distribution center that is configured to receive, execute, and host one or more information management systems or applications for access by one or more users, e.g., the user computing environment 110, according to one embodiment. The service provider computing environment 120 is a traditional data center, a virtual asset computing environment (e.g., cloud computing environment), and/or a hybrid between a traditional data center and a virtual asset computing environment, according to one embodiment.

The service provider computing environment 120 includes an information management system 121 that is configured for automated domain-extensible web scraping, at least partially based, for example, on interfacing with a first domain user interface 162 of a first domain computing environment 160 via a communication channel 106 and/or a second domain user interface 182 of a second domain computing environment 180 via a communication channel 108, according to one embodiment. The information management system 121 includes various components, databases, engines, modules, and data to support, according to one embodiment. The information management system 121 includes a user interface 122, an information management engine 123, system database 125, a scraping services module 130, a building blocks module 140 and an administrative module 150, according to one embodiment. Although the description for FIG. 1 illustrates an information management system 121 that is focused on a financial domain, it is to be understood that this disclosure does not limit the information management system 121 to a finance management system. For example, the information management system 121 could be a healthcare management system, a legal management system, another domain management system, or a combination of domains.

The information management system 121 employs the user interface 122 to at least provide an interface with the user computing environment 110, according to one embodiment. The user interface 122 is accessible by the user computing environment 110 through a web browser or through the user interface 112 of the information management system application 111, installed within the user computing environment 110, according to one embodiment. The user interface includes, but is not limited to, one or more dialog boxes, buttons, menus, directories, thumbnails, text boxes, radio buttons, check boxes, and other user interface elements to enable the user to interact with the information management system 121.

An information management system 121 executes the information management engine 123 to receive, organize, store, and provide data, such as financial data, for one or more users, according to one embodiment. An information management engine 123 that is a financial management engine uses a number of financial management system fields to categorize, order, and organize financial management system data stored in the system database 125, according to one embodiment. Management system fields can be represented within the information management system 121 as a number of different software classes, according to one embodiment. Financial management system fields may include, but are not limited to, one or more of: a due date, an accepted date, an accounts summary date, a service date, a ship date, a delivery date, a company name, a title, an 'accepted by' field, an item, a 'ship via' field, a company tax identification number ("TIN"), a business number, a tracking number, a billing tax number, a company email, a company phone, a company web site, a company logo, a company address, a shipping address, a billing address, terms, a message, an item description, an account summary description, company information, an amount due in words, a quantity, a serial number, a tax rate, an amount due, a deposit, a summary tax, a shipping charge, a discount, a subtotal, a tax amount, a tax home amount, a net home amount, a tax, a rate, an amount, and an account summary amount. The financial management system fields may also include, but are not limited to, customer name, customer billing address, customer email, customer phone, items, item description, unit price, rate, quantity, total amount, subtotal, tasks, invoice, date, invoice due date, comment, company name, company address, company phone, and company web site. The financial management system fields include fields that are suitable for personal finances, business finances, educational institution finances, religious institution finances, and finances of other organizations. In various embodiments, the management system fields include any financial management system fields, or combination of financial management system fields, as discussed herein, and/or as known/available in the art at the time of filing, and/or as developed/made available after the time of filing. The information management engine 123 stores and retrieves the management system fields in a table, chart, database, or other data structure, according to one embodiment.

The financial or other information management system data stored in the system database 125 includes numeric and/or alphanumeric values that may be associated with one or more of the financial or other information management system fields. Financial management system data may comprise financial transaction record data that involve money, such as making a purchase in which money is exchanged for a good or service, receiving a loan from a credit card company, and depositing money in a bank account. The financial management system data is associated with personal finances, business finances, or other organizational finances and is associated with one or more user accounts, according to one embodiment. In various embodiments, the financial management system data includes any financial management system data, or combination of financial management system data, as discussed herein, and/or as known/available in the art at the time of filing, and/or as developed/made available after the time of filing. The information management system data includes information entered by a user or retrieved for a user, according to one embodiment. In one embodiment, the information management system data may be uploaded into the information management system 121 with a file, e.g., an .xml file, a .csv file, a spreadsheet file, or the like. The information management engine 123 stores, organizes, and retrieves the information management system data in a table, chart, database, or other data structure, according to one embodiment. In one embodiment, the information management system fields and the information management system data are combined or included in a single system database 125 or other data structure.

The user interface 122 is configured to enable a user to interact with the information management system 121. As discussed further below, a user, such as a developer, may initiate a process by providing a web site name that is desired to be scraped, a user may modify a dictionary that assists in the process, and a user may modify a configuration file. It is to be understood that a user may perform other tasks including administrative tasks through the user interface 122.

Among other things, the information management system data stored in the database 125 aggregates information from web sites of different institutions, such as financial institutions or banks and other institutions. Each institution may be a member of the same domain or a different domain. Accordingly, a first institution, such as a financial institution, may be a member of a first domain. A second institution, such as a healthcare institution, may be a member of a second domain. The first institution may have a first domain computing environment 160 that comprises a first domain user interface 162, such as a web site with which a user can interact. The first domain computing environment 160 may also comprise a first domain database 161 that may store account numbers and passwords of users. Such information can be necessary for a user to be able to log into the first domain user interface 162 and access information about the user that is stored in the first domain database 161. For example, if the first domain computing environment 160 belongs to a bank, then a user may access and view bank transaction records such as payments and deposits associated with the user's bank account. The second institution may have a second domain computing environment 180 that comprises a second domain user interface 182, such as a web site with which the user can interact. The second domain computing environment 180 may also comprise a second domain database 181 that may store account numbers and passwords of users. As with the first domain computing environment 160, such information can be necessary for a user to be able to log into the second domain user interface 182 and access information about the user that is stored in the second domain database 181. For example, if the second domain computing environment belongs to a healthcare institution, then a user may access and view healthcare financial information such as payments, healthcare insurance remittances, and refunds associated with the user's healthcare account.

Account numbers, passwords and other information related to a user can be collected from users via the user interface 112. Such account numbers and passwords can be stored in the system database 125 of the information management system 121. Such information may be beneficial in order for the information management system 121 to access web sites of institutions for web scraping purposes. The web scraping may be performed such that information from various institutions can be aggregated in the system database 125. Under some embodiments, the scraping process may be performed by logging into a web site as the user with the account number and the password, and determining what kind of account the user has which determines the layout of the web site's display. Then, the information that is intended to be displayed by a domain computing environment, such as the first domain computing environment 160, can be extracted based on the information displayed by the web site. It is to be understood that because the scraping can be automatically performed, the web site need not actually be displayed in order for the information to be extracted. Rather, the information can be extracted from the HTML code that is used to generate a display of the web site.

The information management system 121 may provide for automated extensible web scraping that is extensible to any domain. The information management system 121 may include the scraping services module 130. The scraping services module 130 may include a mapper module 132 and a script generator module 134. The mapper module 132 may classify web sites based on common data of web sites of a domain. The mapper module 132 may further cluster the common data based on common navigation structures of the web sites of the domain. The commonalities of the data and the navigation structures may be used by the script generator module 134 to automatically generate scraping scripts based on predefined and reusable snippets of code for specific parts of navigating web sites. The information management system 121 may include a building blocks module 140 comprising a data model updater module 142, a navigation model generator module 144, and a navigation model matcher module 146, and the information for these modules may be stored in the system database 125. Under some embodiments, the navigation model matcher module 146 may include a navigation model matching algorithm that can be executed, which allows for the creation or revision of a navigation model by the navigation model generator module 144 based on the match by the navigation model matcher module 146, and which also allows for the creation or revision of a data model by the data model updater module 142. Such may be advantageous because if a navigation model and/or a data model exist for a first domain user interface 162, then one or both such models can be reused with response to a second domain user interface 182. Such may be further advantageous because if there is no match, then a respective model can be created. Under some embodiments, a model may describe a pattern, such as a navigation pattern or a data pattern. Under some embodiments, the mapper module 132 may utilize the navigation model from the navigation model generator module 144 and may utilize the data model from the data model updater module 142.

The administrative module 150 may comprise a clustering module 152, which is a utility program that allows for generated scripts to be clustered in relation to each other. The administrative module 150 may also comprise a configuration file maintenance module 154, which allows for the maintenance of configuration files.

The information management system 121 may gather information about a web site in order to create scripts that scrape the web site to extract data from the web site. For example, the information management system 121 may determine the domain of a web site based on a data model of the web site, determine how to navigate the web site based on the navigation model of the web site, and then generate a scraping script to be able to scrape the web site. Such allows an end-to-end process to automatically generate a script to scrape a web site that is extensible to different domains. Such automatic generation of a script may be beneficial in comparison to a manual process of script generation. For example, when a new customer class such as a premium customer is added to an existing domain web site, or new information is provided on an existing domain web site, or a new web site is added within a known domain or a new domain, the script to read data from such can be automatically generated from data models and navigation models from various domains. Thus, automatic generation of scripts can be applicable across domains based on information extracted from web sites.

Figure 2:
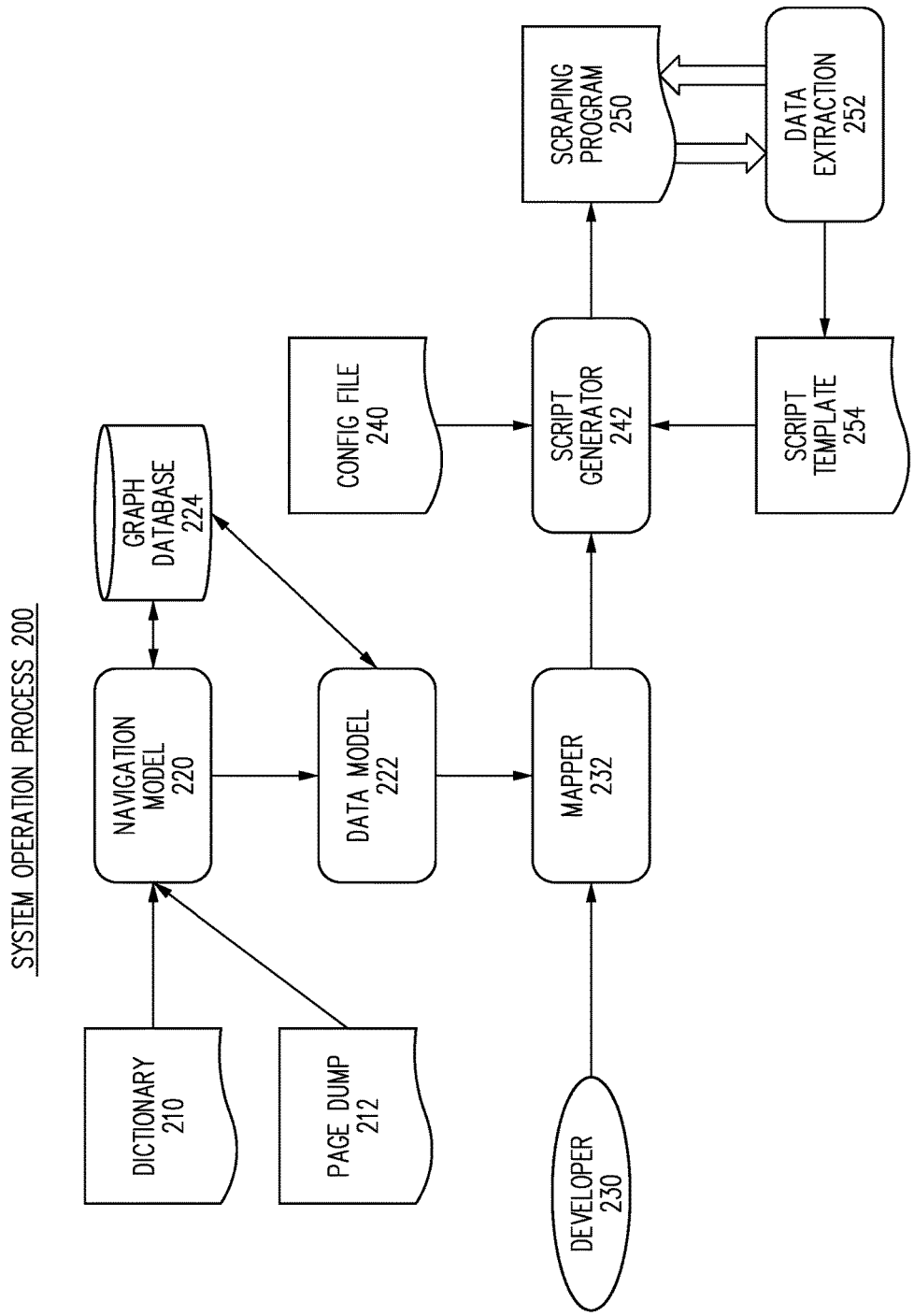
FIG. 2 is a flow diagram of a system operation process for automated domain-extensible web scraping, in accordance with various embodiments.

In various embodiments, the information management system 121 may utilize a scraping script to log in as a user, scrape web pages from an institution's web site, such as the first domain user interface 162 or the second domain user interface 182, and extract out the columns of data, such as data representing the user's transactions and the user's balances at a financial institution. Such may be beneficial for users who have data distributed at more than one institution, such as two or more bank accounts and respective financial institutions.
Process FIG. 2 is a flow diagram of a system operation process 200 for automated domain-extensible web scraping, in accordance with various embodiments.

At DICTIONARY 210, a data dictionary is defined. The data dictionary may comprise information such as information about a web page, columns on a web page, identifier messages of a web page, error messages of a web page, and error conditions. Under some embodiments, messages and conditions may be a standard or common list, such as a system error. For example, bank web sites may have a common list of error messages that a web site is down or inaccessible at a particular point in time. For further example, a web site associated with a domain may have a standard condition that forbids scraping of a web site. Information of the data dictionary may be definable by a user utilizing the user interface 122 of the information management system 121. Under some embodiments, the data dictionary is an input to the system operation process 200, for example, information may flow from the data dictionary to a navigation model matching algorithm.

At PAGE DUMP 212, a page dump is created from a web page to be examined. For example, such a page dump may be a representation of the HTML code of the web page. The page dump information is provided to the navigation model module at NAVIGATION MODEL 220. Under some embodiments, the page dump is an input to the system operation process 200, for example, information may flow from the page dump to a navigation model matching algorithm. Under some embodiments, the information useful for scraping a page is extracted and dumped to a file system stored in the system database 125. A page dump may be beneficial in order to perform the system operation process 200 as a batch process. It is to be understood, however, that the system operation process 200 may be performed in real time.

At NAVIGATION MODEL 220, the navigation model module may utilize a navigation model matching algorithm to match models comparing a web page being examined with web pages that are already in existence. Under some embodiments, each web page may be described with a navigation model that indicates how a web page can be navigated. Such allows for the comparison of the different navigation models. For example, a first bank transaction page, for which a navigation model is already defined, can be compared with a new second bank transaction page. If there is a match, then the first bank navigation model can be reused for the second bank transaction page. If there is no match, then a new navigation model can be created for the second bank transaction page. An instance of the navigation model, whether selected for reuse or created, may be stored in the graph database 224 of the system database 125. Such a navigation model may indicate the flow of a web site or a web page.

Under some embodiments, the graph database 224 may reflect a chain of web pages. For example, a home page of a web site may have certain attributes, and such is reflected in the graph database 224. For a web site such as the first domain user interface 162, a child page of the home page may be a premium customer page, and this page may have certain attributes related to a premium customer account. For a web site such as the second domain user interface 182, a child page of the home page may be a standard customer page, and this page may have certain attributes related to a standard customer account, which may be different from a premium customer account. Accordingly, the graph database 224 may reflect the navigation flow of different web sites with their respective variances in web site flow.

At DATA MODEL 222 an instance of a data model may be populated from information of a web page by populating the properties of the applicable nodes of the graph database 224. The information may be extracted, for example, using the page dump described at PAGE DUMP 212 and the data dictionary described at DICTIONARY 210. An instance of a data model may be stored in the graph database 224 of the system database 125.

At DEVELOPER 230, a developer or another user may provide the mapper module 132 with a web address, such as a URL, or another identifier for a web site such as a web site name. This information may start the system operation process 200, such that a scraping script may be generated for the web site defined by the developer. Under some embodiments, the developer providing a web address may trigger a real-time page dump or a batch-process page dump, as indicated at PAGE DUMP 212. A batch-process page dump may be beneficial in order to perform the system operation process 200 as a batch process. For example, a web page may be dumped at one particular time, and a web site name can be supplied to the mapper module 132 at a different particular time, either earlier or later. Such may be advantageous in situations where the navigation model matcher algorithm takes a long time to execute. It is to be understood, however, that the system operation process 200 may be performed in real time.

At MAPPER 232, the mapper module 132 may utilize an instance of the navigation model and an instance of the data model to create the map of a web site or web page. Such a map can be modified or configured based on a configuration file, as shown at CONFIG FILE 240. Under some embodiments, the mapper module 132 may combine the applicable navigation model and the applicable data model of the graph database 224 prior to creating the mapping.

At SCRIPT GENERATOR 242, the script generator module 134 may generate a script that enables scraping of a web site for data associated to a user. It is to be appreciated that the scraping script may be generated by mapping information from the mapper module 132. The scraping script may also be generated based on a previously defined script template, as described at SCRIPT TEMPLATE 254.

At CONFIG FILE 240, the configuration file described at MAPPER 232 can be edited or modified by a user via the user interface 122. Under some embodiments, the configuration file can be edited to customize the scraping script generated by the script generator module 134 based on the mapper module 132 and/or a script template. Such can allow a user, such as a developer, to confirm, edit, or clean up the configuration file used by the generated script. A configuration file may be specific to a particular web site, and may provide input information for executing a generated script.

Being able to edit the configuration file may be beneficial to be able to customize the scraping script generated by the script generator module 134. Such customizations can include certain configurations or overrides to the script, such as customizing certain style sheets and the like. Such can allow for improvement to an automatically generated script that is domain extensible.

At SCRAPING PROGRAM 250, the scraping program utilizes the generated scraping script from the script generator module 134 to scrape a web site, such as the first domain user interface 162 or the second domain user interface 182. Under this embodiment, the web sites to be scraped are displaying information associated to a user. Such information may be displayed only after providing a web site with user authentication information.

At DATA EXTRACTION 252, data is extracted from the web site and is stored in the system database 125. Under some embodiments, a data extraction services module may be utilized to extract data. Such may be created or modified from XML Path Language (Xpath), Cascading Style Sheets (CSS), Extensible Hypertext Markup Language (XHTML), and/or the like. Representational state transfer (REST) services, or the like, may be utilized to execute the scraping script and extract the associated data from the web site. The REST services may be a data extraction services layer that is based on an API that can be called or executed to extract data. Under some embodiments, the generated script allows for syntactic level scraping. Under some embodiments, automatable scraping can be extensible across domains.

At SCRIPT TEMPLATE 254, a script template may be created or modified from the data extraction services module. A script template can be created or modified from Java, Python, NodeJS, and the like. A script template may be snippets of code that can be reused independently from the domain from which the snippet originated. A script template may reflect patterns of code or logic that can be inserted into the generated script. For example, a script template may be instructions to retrieve data from a table or retrieve data from a column of a table. Under some embodiments, common script templates can be used by the script generator module 134 to generate scraping scripts based on combinations of script templates. As scraping of web sites occurs, new script templates can be added or existing script templates can be modified, and these script templates can be used by the script generator module 134. Such may be beneficial to generate improved scraping scripts over time.

Figure 3:
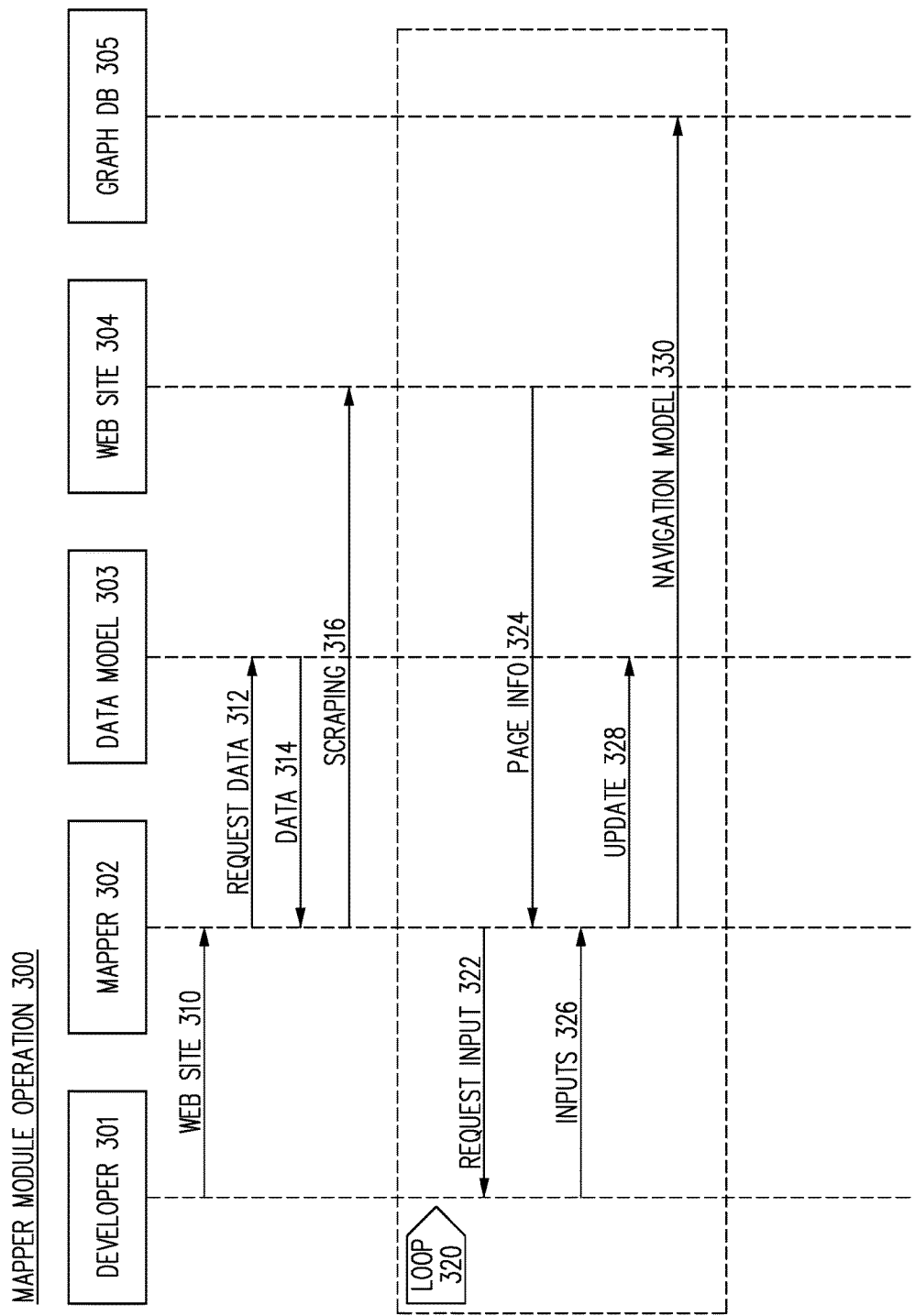
FIG. 3 is a sequence diagram of a mapper module operation for automated domain-extensible web scraping, in accordance with various embodiments.

FIG. 3 is a sequence diagram of a mapper module operation 300 for automated domain-extensible web scraping, in accordance with various embodiments.

At WEB SITE 310, a developer 301 or other user utilizes the user interface 122 to transmit a web site address, such as a URL, to a mapper module 302, and the mapper module 302 receives the web site name. Under some embodiments, the web site name may be translated to a domain class, such as a financial institution class. Under some embodiments, a web site name may be represented as a URL. Under some embodiments, the developer 301 transmitting a web site name can be considered to start the mapper module operation 300.

At REQUEST DATA 312, the mapper module 302 transmits a query to the data model module 303 for data, and correspondingly the data model module 303 receives the query.

At DATA 314, the data model module 303 responds to the query at REQUEST DATA 312 by transmitting applicable data, and correspondingly the mapper module 302 receives the data.

At SCRAPING 316, the mapper module 302 communicates with the web site 304 to extract scraping information based, for example, on the data received at DATA 314. In certain embodiments, such may be considered semantic level scraping in order to build a scraping script to perform syntactic level scraping.

At LOOP 320, a looping or iterative process is provided comprising REQUEST INPUT 322, PAGE INFO 324, INPUTS 326, UPDATE 328, and NAVIGATION MODEL 330. Such reflects that these sequences may be looped for each relevant web page of a web site.

At REQUEST INPUT 322, the mapper module 302 queries the developer 301 via the user interface 122 for inputs from the developer 301 that are requested by the web site 304. Correspondingly, the developer 301 receives the query from the mapper module 302 via the user interface 122.

At PAGE INFO 324, the mapper module receives page information from the web site 304. Under some embodiments, the web page may require information from a user. For example, the web page may require user input such as authentication information in order to access secure web pages. Under this example, a web page of the web site 304 may require a user name and password for login, or may require a one-time password (OTP) for multi-factor authentication (MFA).

At INPUTS 326, the developer 301 may transmit inputs to the mapper module 302 via the user interface 122 that is required or requested by the web site 304. Correspondingly, the mapper module 302 may receive the inputs. The inputs may include the user input information described at PAGE INFO 324. Furthermore, the process of receiving page information from the web site 304 described at PAGE INFO 324 may be repeated with the user input information. In addition, based on a request from the web site 304, additional inputs may be requested from the developer 301 and received from the developer 301, as described at REQUEST INPUT 322 and INPUTS 326. It is to be understood that the order of this process may be changed depending on the information required or requested by the web site 304.

At UPDATE 328, the mapper module 302 may update an instance of a data model of the data model module 303 based on the input information from the developer and the page information from the web site 304. For example, node properties of an instance of a data model may be populated.

At NAVIGATION MODEL 330, the mapper module 302 may update or create an instance of a navigation model of the navigation model module 220, and store it in the graph database 305. Such may be used to create a mapping of the web site 304. It is to be understood that the order of the sequence diagram is not meant to be limiting. For example, under some embodiments, NAVIGATION MODEL 330 may precede UPDATE 328. It is to be further understood that the sequences described for REQUEST INPUT 322, PAGE INFO 324, INPUTS 326, UPDATE 328, and NAVIGATION MODEL 330 may repeat or loop for applicable web pages of a web site, as described at LOOP 320.

Figure 4:
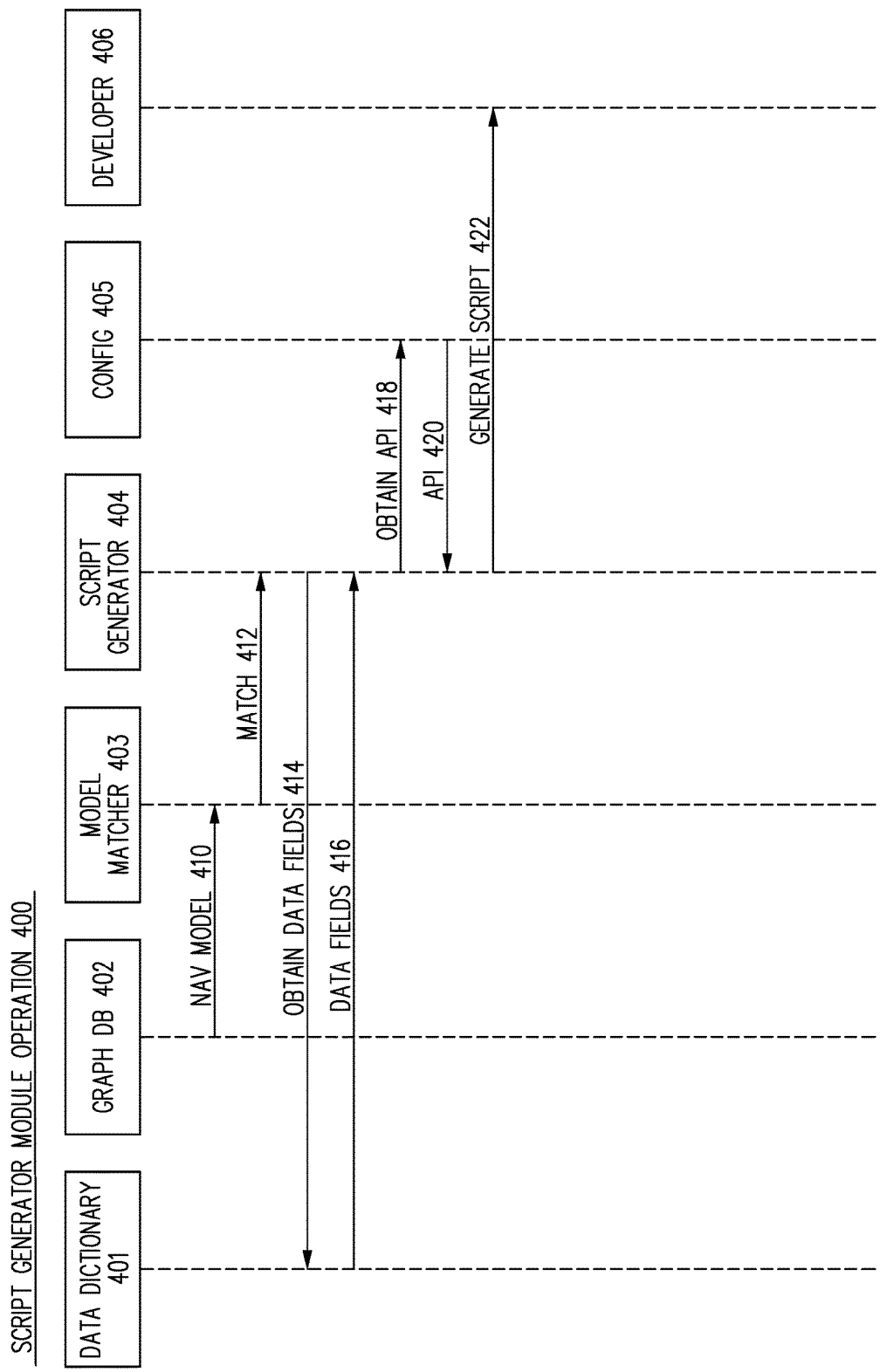
FIG. 4 is a sequence diagram of a script generator module operation for automated domain-extensible web scraping, in accordance with various embodiments.

FIG. 4 is a sequence diagram of a script generator module operation 400 for automated domain-extensible web scraping, in accordance with various embodiments.

At NAV MODEL 410, the graph database module 402 transmits one or more instances of navigation models to the navigation model matcher module 403. Correspondingly, the navigation model matcher module 403 receives the one or more instances of navigation models from the graph database module 402 and determines a closest match between the web site being examined and the one or more navigation model instances.

At MATCH 412, the navigation model matcher module 403 transmits to the script generator module 404 the instance of the navigation model that is the closest match. Correspondingly, the script generator module 404 receives the closest match navigation model from the navigation model matcher module 403.

At OBTAIN DATA FIELDS 414, the script generator module 404 transmits a request to the data dictionary module 401 for data fields associated with the closest matched navigation model. Correspondingly, the data dictionary module 401 receives the request from the script generator module 404. The data dictionary module 401 may comprise a data dictionary of data fields.

At DATA FIELDS 416, the data dictionary module 401 transmits to the script generator module 404 the data fields that are associated with the closest matched navigation model. Correspondingly, the script generator module 404 receives from the data dictionary model 401 the associated data fields.

At OBTAIN API 418, the script generator module 404 transmits to the configuration module a request for APIs from the configuration file module 405. Correspondingly, the configuration file module 405 may receive the request for APIs from the script generator module 404. The configuration file module 405 may comprise a configuration file that may be an XML file or the like.

At API 420, the configuration file module 405 transmits one or more corresponding APIs to the script generator module 404. Correspondingly, the script generator module 404 receives the one or more corresponding APIs from the configuration file module 405. The script generator module 404 may generate or compose a scraping script from the corresponding APIs.

At GENERATE SCRIPT 422, the script generator module 404 may display the generated scraping script to the developer 406 via the user interface 122. The developer 406 may then edit or modify the generated scraping script.

The disclosed processes for automated domain-extensible web scraping provide a technical solution for obtaining more detailed, connected, and reliable scraping of web sites that provide users with services across domains. Consequently, the disclosed processes for automated domain-extensible web scraping provide a technical solution to the long standing technical problem in the web site scraping field of an inability to quickly and efficiently create scripts with which to scrape web sites across domains.

The disclosed processes do not encompass, embody, or preclude other forms of innovation in the area of web scraping. In addition, the disclosed processes for automated domain-extensible web scraping are not related to any fundamental economic practice, fundamental data processing practice, mental steps, or pen and paper based solutions, and is, rather, directed to providing solutions to the relatively new problems associated with scraping web sites. Consequently, the disclosed processes for automated domain-extensible web scraping are not directed to, do not encompass, and are not merely, an abstract idea or concept.

In addition, the disclosed processes for automated domain-extensible web scraping provide for significant improvements to the technical fields of web scraping system analysis, information dissemination, data processing, data management, and user experience.

According to one embodiment, a new web site of a new domain can be added to an information management system quicker and cheaper. Furthermore, the automatic creation of scraping scripts leads to faster script generation with less human error and more efficient scraping of web sites. Therefore, the various embodiments of the disclosure, and their associated benefits, as discussed herein, improve the technical field of web scraping in an evolving, dynamic, manner that is customized to an individual web site. Consequently, the disclosed embodiments amount to significantly more than an implementation of the abstract idea of a user viewing a web site.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description may present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "associating," "aggregating," "collecting," "creating," "comparing," "defining," "determining," "generating," "identifying," "initiating," "obtaining," "providing," "processing," "presenting," "receiving," "storing," "searching," "selecting," "transferring," etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real-time network operating systems.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient and/or efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures are identified using a particular nomenclature for ease of description and understanding, but other nomenclature is often used in the art to identify equivalent operations.

As discussed above, using the above embodiments, with little or no modification and/or input, there is considerable flexibility, adaptability, and opportunity for customization to meet the specific needs of various users under numerous circumstances. In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented method for automated domain-extensible web scraping, comprising:

at a mapper module, receiving address data representing a web site;

at a navigation model module, receiving page dump data representing a web page of the web site;

at the navigation model module, receiving data dictionary data;

at the navigation model module, applying a navigation model matching algorithm configured to compare the page dump data with a first domain navigation model instance and a second domain navigation model instance, wherein the comparison of the page dump data with the first domain navigation model instance and the second domain navigation model instance is based at least in part on the data dictionary data, and further wherein the data dictionary data comprises at least one synonym;

at the navigation model module, transmitting to the mapper module results of the comparison of the page dump data with the first domain navigation model instance and the second domain navigation model instance;

at the mapper module, using the results of the comparison of the page dump data to create an instance of a navigation model applicable to the web site represented by the address data, wherein the instance of the navigation model applicable to the web site represented by the address data is domain extensible;

at the mapper module, transmitting the instance of the navigation model applicable to the web site represented by the address data to a script generator module;

at the script generator module, receiving the instance of the navigation model applicable to the web site represented by the address data;

at the script generator module, receiving at least one script template;

at the script generator module, generating a scraping script that is applicable to the web site, wherein the scraping script is based on the instance of the navigation model applicable to the web site represented by the address data and the at least one script template; and at the script generator module, transmitting the scraping script to a scraping program module, wherein the scraping program module is configured to execute the scraping script.

2. The method of claim 1, further comprising:
at the scraping program module, receiving authentication data configured to authenticate a login with the web site;
at the scraping program module, executing the scraping script with the authentication data;
at the scraping program module, extracting first domain user data from the web site at a syntactical level; and
at the scraping program module, storing the first domain user data in a database for aggregation with second domain user data.

3. The method of claim 1, further comprising:
at the script generator module, receiving a configuration file, wherein the configuration file comprises an input for the scraping script.

4. The method of claim 1, further comprising:
at the script generator module, receiving an instance of a data model, wherein the instance of the data model comprises at least one populated node property.

5. The method of claim 4, wherein the at least one populated node property of the instance of the data model is stored in a graph database by a data model module.

6. A non-transitory computer-readable medium having a plurality of computer-executable instructions which, when executed by a processor, performs a method for automated domain-extensible web scraping, the plurality of computer-executable instructions comprising:
a mapper module configured to receive address data representing a web site;
a navigation model module configured to receive page dump data representing a web page of the web site;
the navigation model module configured to receive data dictionary data, wherein the data dictionary data comprises at least one synonym;
the navigation model module further configured to apply a navigation model matching algorithm configured to compare the page dump data with a first domain navigation model instance and a second domain navigation model instance, wherein the comparison of the page dump data with the first domain navigation model instance and the second domain navigation model instance is based at least in part on the data dictionary data, and further wherein the data dictionary data comprises at least one synonym;
the navigation model module further configured to transmit to a mapper module results of the comparison of the page dump data with the first domain navigation model instance and the second domain navigation model instance;
the mapper module further configured to use the results of the comparison of the page dump data to create an instance of a navigation model applicable to the web site represented by the address data, wherein the instance of the navigation model applicable to the web site represented by the address data is domain extensible;
the mapper module further configured to transmit the instance of the navigation model applicable to the web site represented by the address data to a script generator module;
the script generator module configured to receive the instance of the navigation model applicable to the web site represented by the address data;
the script generator module further configured to receive at least one script template;
the script generator module further configured to generate a scraping script that is applicable to the web site, wherein the scraping script is based on the instance of the navigation model applicable to the web site represented by the address data and the at least one script template; and
the script generator module further configured to transmit the scraping script to a scraping program module, wherein the scraping program module is configured to execute the scraping script.

7. The non-transitory computer-readable medium of claim 6, the plurality of computer-executable instructions further comprising:
the scraping program module further configured to receive authentication data configured to authenticate a login with the web site;
the scraping program module further configured to execute the scraping script with the authentication data;
the scraping program module further configured to extract first domain user data from the web site at a syntactical level; and
the scraping program module further configured to store the first domain user data in a database for aggregation with second domain user data.

8. The non-transitory computer-readable medium of claim 6, the plurality of computer-executable instructions further comprising:
the script generator module further configured to receive a configuration file, wherein the configuration file comprises an input for the scraping script.

9. The non-transitory computer-readable medium of claim 6, the computer-executable instructions further comprising:
the script generator module further configured to receive an instance of a data model, wherein the instance of the data model comprises at least one populated node property.

10. The non-transitory computer-readable medium of claim 9, wherein the at least one populated node property of the instance of the data model is stored in a graph database by a data model module.

11. A system for automated domain-extensible web scraping, the system comprising:
one or more processors; and
at least one memory coupled to the one or more processors, the at least one memory having stored therein instructions which, when executed by any set of the one or more processors, perform a process for automated domain-extensible web scraping, the process including:
at a mapper module, receiving address data representing a web site;
at a navigation model module, receiving page dump data representing a web page of the web site;
at the navigation model module, receiving data dictionary data;
at the navigation model module, applying a navigation model matching algorithm configured to compare the page dump data with a first domain navigation model instance and a second domain navigation model instance, wherein the comparison of the page dump data with the first domain navigation model instance and the second domain navigation model instance is based at least in part on the data dictionary data, and further wherein the data dictionary data comprises at least one synonym;
at the navigation model module, transmitting to a mapper module results of the comparison of the page dump data with the first domain navigation model instance and the second domain navigation model instance;
at the mapper module, using the results of the comparison of the page dump data to create an instance of a navigation model applicable to the web site represented by the address data, wherein the instance of the navigation model applicable to the web site represented by the address data is domain extensible;
at the mapper module, transmitting the instance of the navigation model applicable to the web site represented by the address data to a script generator module;
at the script generator module, receiving the instance of the navigation model applicable to the web site represented by the address data;
at the script generator module, receiving at least one script template;
at the script generator module, generating a scraping script that is applicable to the web site, wherein the scraping script is based on the instance of the navigation model applicable to the web site represented by the address data and the at least one script template; and
at the script generator module, transmitting the scraping script to a scraping program module, wherein the scraping program module is configured to execute the scraping script.

12. The system of claim 11, the process further including:
at the scraping program module, receiving authentication data configured to authenticate a login with the web site;
at the scraping program module, executing the scraping script with the authentication data;
at the scraping program module, extracting first domain user data from the web site at a syntactical level; and
at the scraping program module, storing the first domain user data in a database for aggregation with second domain user data.

13. The system of claim 11, the process further including:
at the script generator module, receiving a configuration file, wherein the configuration file comprises an input for the scraping script.

14. The system of claim 11, the process further including:
at the script generator module, receiving an instance of a data model, wherein the instance of the data model comprises at least one populated node property.

* * * * *